(12) United States Patent
Liu

(10) Patent No.: US 11,103,008 B2
(45) Date of Patent: Aug. 31, 2021

(54) ATOMIZER WITH OIL LOCKING FUNCTION AND ELECTRONIC CIGARETTE

(71) Applicant: SHENZHEN BUDDY TECHNOLOGY DEVELOPMENT CO., LTD, Guangdong (CN)

(72) Inventor: Xiang Liu, Guangdong (CN)

(73) Assignee: SHENZHEN BUDDY TECHNOLOGY DEVELOPMENT CO., LTD, Guangdong (CN)

( * ) Notice: Subject to any disclaimer, the term of this patent is extended or adjusted under 35 U.S.C. 154(b) by 476 days.

(21) Appl. No.: 16/109,780

(22) Filed: Aug. 23, 2018

(65) Prior Publication Data

US 2019/0357595 A1    Nov. 28, 2019

(30) Foreign Application Priority Data

May 28, 2018 (CN) .......................... 201820804343.7

(51) Int. Cl.
| | | |
|---|---|---|
| A24F 40/42 | (2020.01) |
| F16J 15/324 | (2016.01) |
| A24F 40/10 | (2020.01) |
| A24F 40/46 | (2020.01) |

(52) U.S. Cl.
CPC ............. *A24F 40/42* (2020.01); *F16J 15/324* (2013.01); *A24F 40/10* (2020.01); *A24F 40/46* (2020.01)

(58) Field of Classification Search
None
See application file for complete search history.

(56) References Cited

FOREIGN PATENT DOCUMENTS

CN          206586399 U   * 10/2017

* cited by examiner

*Primary Examiner* — Phu H Nguyen
(74) *Attorney, Agent, or Firm* — JCIPRNET

(57) ABSTRACT

An atomizer with an oil locking function includes a cigarette holder and an atomizer body provided with an oil chamber. An inner wall of the oil chamber is composed of a fixing component and a rotating component that are in a rotating fit. The fixing component is provided with an oil guiding hole and is connected to the cigarette holder. The rotating component includes a first rotation angle causing the oil locking hole and the oil guiding hole to be aligned with each other, and a second rotational angle causing the oil locking hole and the oil guiding hole to be mutually staggered from each other.

10 Claims, 3 Drawing Sheets

ATOMIZER WITH OIL LOCKING FUNCTION AND ELECTRONIC CIGARETTE

CROSS-REFERENCE TO RELATED APPLICATION

This application claims the priority benefit of China application serial no. 201820804343.7, filed on May 28, 2018. The entirety of the above-mentioned patent application is hereby incorporated by reference herein and made a part of this specification.

TECHNICAL FIELD

The invention relates to an e-liquid electronic cigarette, and more particularly relates to an atomizer with oil locking function and an electronic cigarette.

RELATED ART

An e-liquid electronic cigarette contains e-liquid by an oil chamber that is internally installed. The e-liquid communicates with or is released from a heat generating component of an atomizer through an oil guiding hole, and supplies oil to the heat generating component when the heat generating component is heating. However, since an oil passage between the oil chamber and the heat generating component of the atomizer is always in a communication state, oil leakage is likely to be occurred during a long-term placement and transportation.

SUMMARY OF THE INVENTION

The objects in the invention is in view of the abovementioned problems of the prior art to provide with an atomizer with oil locking function and an electronic cigarette. In this invention, a structure of oil locking is realized by an inner wall of an oil chamber composed by a fixing component and a rotating component which are in a rotating fit. Liquid can be locked and guided by rotating the cigarette holder. When not smoking, the liquid is locked, thus the connection between the smoke oil and an outside world is completely blocked. Oil leakage is prevented when being placed and transported for a long time, and the liquid in the oil chamber can be kept fresh.

To solve the aforesaid problems, the following technical solutions can be adopted.

An atomizer with an oil locking function includes a cigarette holder, and an atomizer body provided with an oil chamber. An inner wall of the oil chamber is composed of a fixing component and a rotating component which are in a rotating fit. An oil guiding hole is provided on the fixing component. The rotating component is provided with an oil locking hole and is connected to the cigarette holder. The rotating component includes a first rotation angle causing the oil locking hole and the oil guiding hole to be aligned with each other, and a second rotational angle causing the oil locking hole and the oil guiding hole to be mutually staggered from each other.

Preferably, a first sealing ring is located on one side between the fixing component and the rotating component, and a second sealing ring is located on another side therebetween.

Preferably, the fixing component includes an oil locking ring and a cigarette liquid tube. The cigarette liquid tube has one end sheathing the oil locking ring and another end inserted into the cigarette holder. A third sealing ring is arranged between the cigarette liquid tube and the oil locking ring. A fourth sealing ring is arranged between the cigarette liquid tube and the cigarette holder. The oil locking hole is located on the oil locking ring. The rotating component includes an atomizing sleeve and an air guiding tube connected to and internally communicating with each other. The oil guiding hole is located on the atomizing sleeve. The atomizer body includes a base, a heating component located inside the atomizing sleeve and located at an inner side of the oil guiding hole. The base is connected with the oil locking ring. The atomizing sleeve is inserted into an inner hole of the oil locking ring. The air guiding tube is inserted into an inner hole of the cigarette holder and communicating with a cigarette holder hole of the cigarette holder.

Preferably, the air guiding tube is inserted into the inner hole of the cigarette holder and is in threaded connection with the cigarette holder.

Preferably, an annular gasket is arranged between an end of the air guiding tube and an end surface of the inner hole of the cigarette holder.

Preferably, the heating component includes a non-woven fabric located inside of the oil guiding hole, and a microporous ceramic heating tube wrapped by the non-woven fabric. An insulating ring is arranged at an end of the inner hole of the oil locking ring. An atomizer thimble is provided in the insulating ring. A negative electrode of the microporous ceramic heating tube is in electrical connection and conduction with the atomizing sleeve. The oil locking ring and the base successively. A positive electrode of the microporous ceramic heating tube is in electrical connection and conduction with the atomizer thimble.

Preferably, a silica gel sleeve is provided in an inner hole of the base, and a thimble sleeve is inserted into the silica gel sleeve and is in electrical connection to the atomizer thimble.

Preferably, an oil leakage preventing steel ball is embedded in an inner hole of the thimble sleeve. A gas cap is inserted into an inner hole of the thimble sleeve. The leakage preventing oil steel ball is embedded in a chamber that is pressing-formed by the inner hole of the thimble sleeve and the air cap.

An electronic cigarette includes an atomizer and a battery rod assembly. The atomizer is an atomizer with an oil locking function as abovementioned.

Compared with the related art, the invention has following advantages. The structure of oil locking is realized by the inner wall of the oil chamber composed of the fixing component and the rotating component which are in a rotating fit. The liquid can be locked and guided by rotating the cigarette holder. When not smoking, the liquid is locked, thus the connection between the smoke oil and the outside world is completely blocked. It is prevented from oil leakage during long-term placement and transportation, such that the liquid in the oil chamber can be kept fresh.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
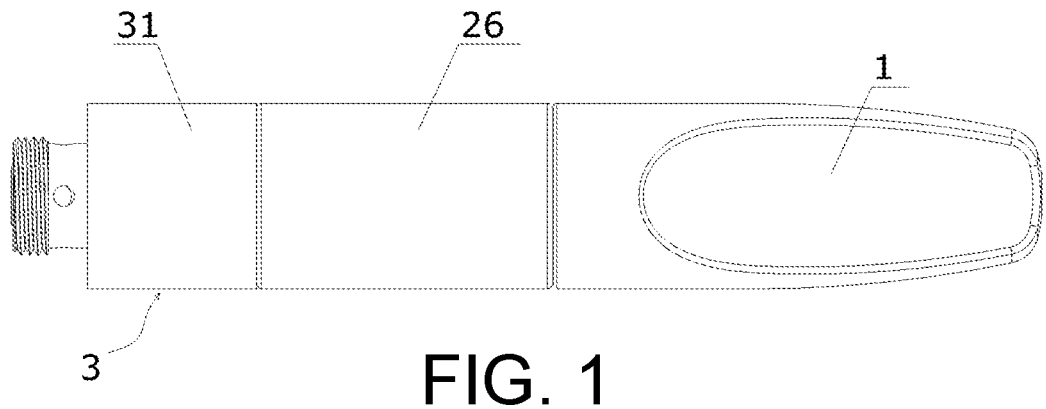
FIG. 1 is a front view of an atomizer in the invention.
Figure 2:
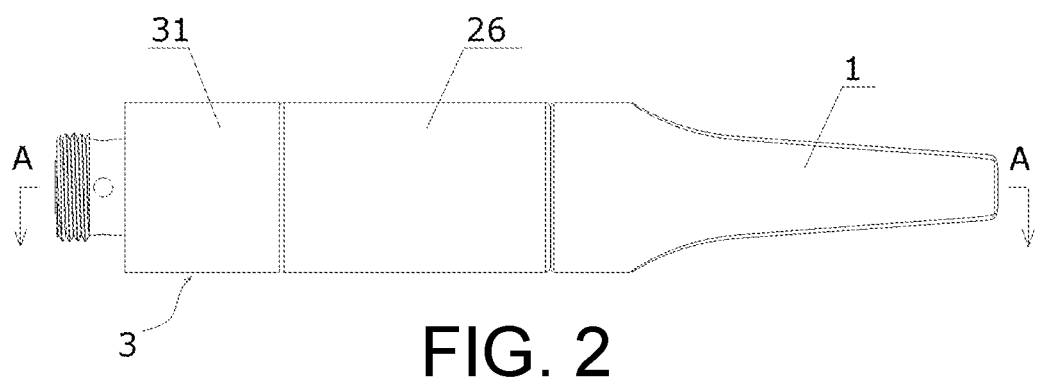
FIG. 2 is a top view of the atomizer in the invention.

As shown in FIG. 1 to FIG. 5, an atomizer with oil locking function includes a cigarette holder 1 and an atomizer body 3 provided with an oil chamber 2. An inner wall of the oil chamber 2 is composed of a fixing component and a rotating component that are in a rotating fit. The fixing component is provided with an oil guiding hole 21. The rotating component is provided with an oil locking hole 22 and is connected to the cigarette holder 1. The rotating component includes a first rotation angle causing the oil locking hole 22 and the oil guiding hole 21 to be aligned with each other, and a second rotational angle causing the oil locking hole 22 and the oil guiding hole 21 to be mutually staggered from each other. An operate process of the atomizer with an oil locking function is shown as follows. First, rotating the cigarette holder 1 until the second rotation angle causes the oil locking hole 22 and the oil guiding hole 21 to be offset from each other, so that the oil guiding hole 22 is in a closed state, and then it can be placed or transported for a long time without oil leakage. When smoking, rotating the cigarette holder 1 in an opposite direction until the first rotation angle causes the oil locking hole 22 and the oil guiding hole 21 to be aligned with each other, so that the oil guiding hole 22 is in a connected state, and that smoking can be performed. If the cigarette holder 1 is continued to be twisting in the opposite direction, the fixing component and the rotating component are completely detached from each other. Afterwards, the cigarette holder 1 can be unscrewed out to allow refill of the oil.

Figure 3:
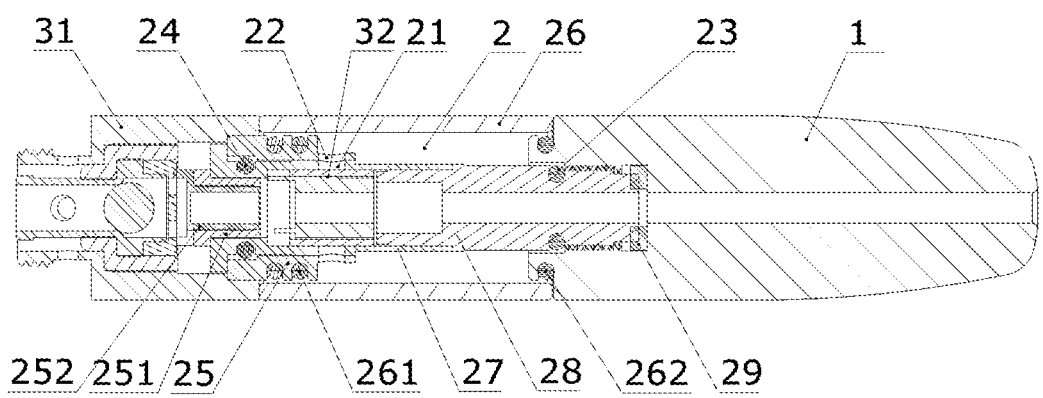
FIG. 3 is a sectional view taken from line A-A in FIG. 2.
Figure 4:
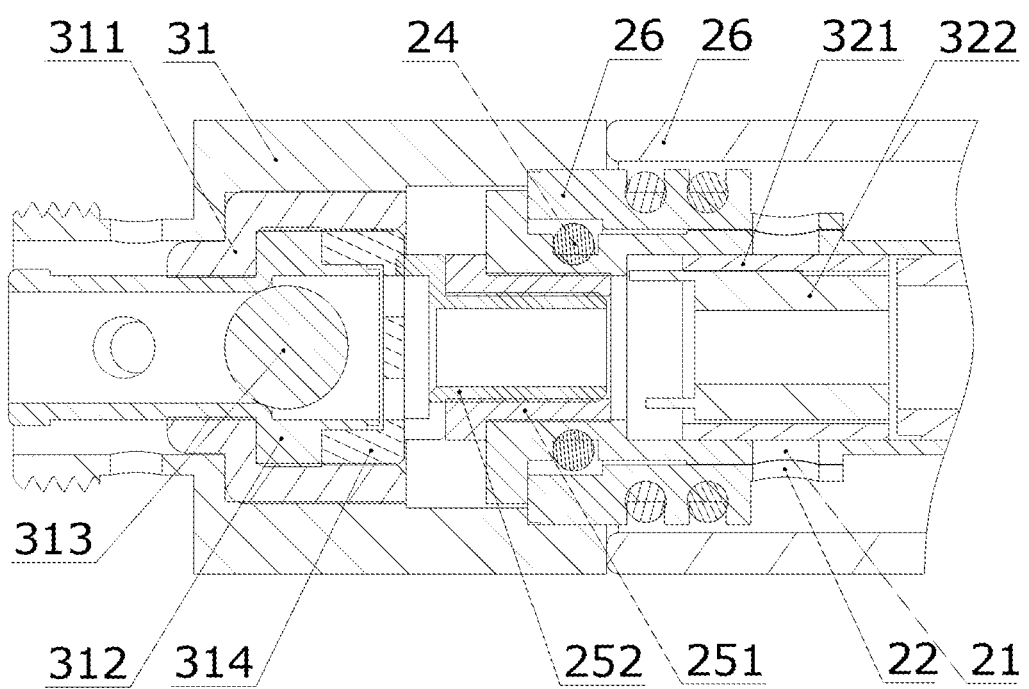
FIG. 4 is a partially-enlarged view of FIG. 3.
Figure 5:
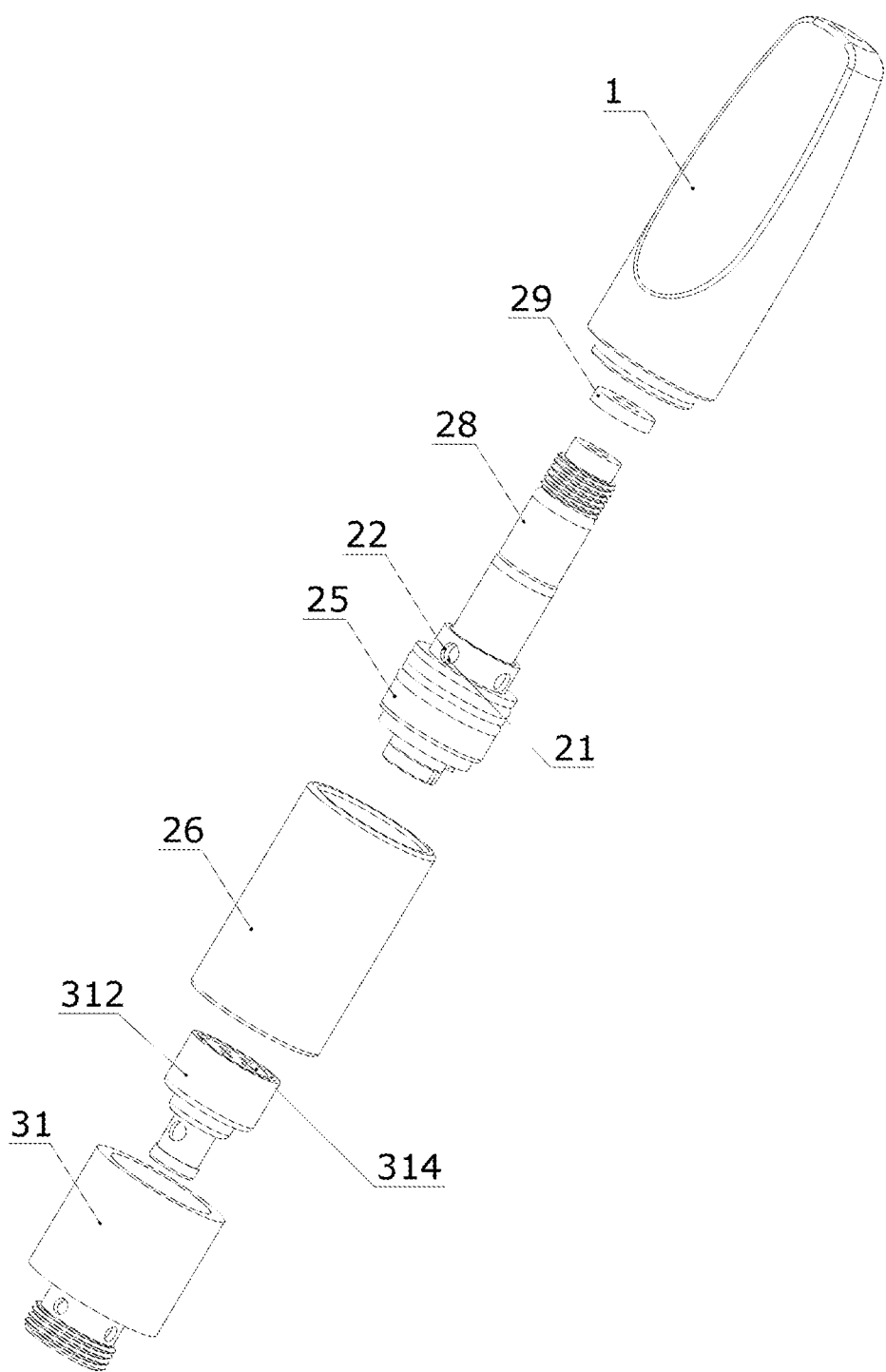
FIG. 5 is a schematic exploded perspective view of the atomizer in the invention.

As shown in FIG. 3, FIG. 4, and FIG. 5, a first sealing ring 23 is located on one side between the fixing component and the rotating component, and a second sealing ring 24 is located on another side therebetween. The sealing between the fixing component and the rotating component is ensured by the abovementioned structure.

As shown in FIG. 3, FIG. 4, and FIG. 5, the fixing component includes an oil locking ring 25 and a cigarette liquid tube 26. The cigarette liquid tube 26 has one end sheathing the oil locking ring 25, and another end inserted into the cigarette holder 1. A third sealing ring 261 is arranged between the cigarette liquid tube 26 and the oil locking ring 25. A fourth sealing ring 262 is arranged between the cigarette liquid tube 26 and the cigarette holder 1. The oil locking hole 22 is located on the oil locking ring 25. The rotating component includes an atomizing sleeve 27 and an air guiding tube 28 that are connected to and internally communicating with each other. The oil guiding hole 28 is located on the atomizing sleeve 27. The atomizer body 3 includes a base 31 and a heating component 32 located inside the atomizing sleeve 27 and located at an inner side of the oil guiding hole 21. The base 31 is connected with the oil locking ring 25. The atomizing sleeve 27 is inserted into an inner hole of the oil locking ring 25. The air guiding tube 28 is inserted into an inner hole of the cigarette holder 1 and communicating with a cigarette holder hole of the cigarette holder 1. The separation and reliable sealing between the fixing component and the rotating component can be achieved by the abovementioned structure.

As shown in FIG. 3, FIG. 4, and FIG. 5, the air guiding tube 28 is inserted into the inner hole of the cigarette holder 1 and is in threaded connection with the cigarette holder 1. The threaded connection ensures that an adjustment range can be controlled when the rotating cigarette holder 1 drives the rotating component. As a result, the connection between the fixing component and the rotating component is reliable, and the refill is quick and convenient.

As shown in FIG. 3, FIG. 4, and FIG. 5, an annular gasket 29 is arranged between one end of the air guiding tube 28 and one end surface of the inner hole of the cigarette holder 1. The annular gasket 29 is as a resistance to the rotation between the fixing component and the rotating component. On one hand, the annular gasket 29 prevents a rotation between the fixing component and the rotating component. On the other hand, the annular gasket 29 brings a damping feeling when manually rotating the cigarette holder 1 to drive the rotating component. The adjustment range is controllable, and the adjustment is more accurate and reliable.

As shown in FIG. 3, FIG. 4, and FIG. 5, the heating component 32 includes a non-fabric 321 located inside of the oil guiding hole 21, and a microporous ceramic heating tube 322 wrapped by the non-fabric 321. An insulating ring 251 is arranged at an end of the inner hole of the oil locking ring 25. The insulating ring 251 includes an atomizer thimble 252 disposed therein. A negative electrode of the microporous ceramic heating tube 322 is in electrical connection and conduction with the atomizing sleeve 27, the oil locking ring 25 and the base 31 successively. A positive electrode of the microporous ceramic heating tube 322 is in electrical connection and conduction with the atomizer thimble 252. The microporous ceramic heating tube 322 has good oil guiding property, and the atomized feeling is excellent. The heating method of the microporous ceramic heating tube 322 can be in the form of externally attached, embedded or internally attached heat-generating components.

As shown in FIG. 3, FIG. 4, and FIG. 5, the inner hole of the base 31 is provided with a silica gel sleeve 311. A thimble sleeve 312 is inserted into the silica gel sleeve 311, and is in electrical connection to the atomizer thimble 252. In this embodiment, the thimble sleeve 312 and the atomizer thimble 252 are in electrically connection via contact; in other embodiments, wire connections or other connection methods may be used as required.

As shown in FIG. 3, FIG. 4, and FIG. 5, an oil leakage preventing steel ball 313 is embedded in an inner hole of the thimble sleeve 312. A gas cap 314 is inserted into the inner hole of the thimble sleeve 312. The oil leakage preventing oil steel ball 313 is embedded in the chamber that is pressing-formed by the inner hole of the thimble sleeve 312 and the air cap 314. The oil leakage preventing steel ball 313 is used for preventing liquid condensate from flowing downward. When smoking, a negative pressure is generated in the inner hole of the thimble sleeve 312, so that the oil leakage preventing steel ball 313 is sucked to intake air, and simultaneously the liquid condensates will not flow out from an opening due to the negative pressure. When not smoking, the oil leakage preventing steel ball 313 would block the inner hole of the thimble sleeve 312 due to gravity to prevent the liquid condensate from flowing downward.

Additionally, in this embodiment, an electronic cigarette includes an atomizer and a battery rod assembly. The atomizer is an atomizer with an oil locking function as abovementioned.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An atomizer with an oil locking function, the atomizer comprising a cigarette holder and an atomizer body provided with an oil chamber,
    wherein an inner wall of the oil chamber is composed of a fixing component and a rotating component which are in a rotating fit, an oil guiding hole is provided on the fixing component,
    wherein the rotating component is provided with an oil locking hole and is connected to the cigarette holder,
    wherein the rotating component includes a first rotation angle causing the oil locking hole and the oil guiding hole to be aligned with each other, and a second rotational angle causing the oil locking hole and the oil guiding hole to be mutually staggered from each other,
    a first sealing ring is located on one side between the fixing component and the rotating component, and a second sealing ring is located on another side therebetween,
    the fixing component includes an oil locking ring and a cigarette liquid tube, the cigarette liquid tube has one end sheathing the oil locking ring, and another end inserted into the cigarette holder,
    a third sealing ring is arranged between the cigarette liquid tube and the oil locking ring, a fourth sealing ring is arranged between the cigarette liquid tube and the cigarette holder, the oil locking hole is located on the oil locking ring,
    the rotating component includes an atomizing sleeve and an air guiding tube that are connected to and internally communicating with each other, the oil guiding hole is located on the atomizing sleeve,
    the atomizer body includes a base, and a heating component located inside the atomizing sleeve and located at an inner side of the oil guiding hole,
    the base is connected with the oil locking ring, the atomizing sleeve is inserted into an inner hole of the oil locking ring, the air guiding tube is inserted into an inner hole of the cigarette holder and communicating with a cigarette holder hole of the cigarette holder,
    the heating component includes a non-woven fabric located inside of the oil guiding hole, and a microporous ceramic heating tube wrapped by the non-woven fabric, an insulating ring is arranged at an end of the inner hole of the oil locking ring, an atomizer thimble is provided in the insulating ring, and
    a negative electrode of the microporous ceramic heating tube is in electrical connection and conduction with the atomizing sleeve, the oil locking ring and the base successively, a positive electrode of the microporous ceramic heating tube is in electrical connection and conduction with the atomizer thimble.

2. An atomizer with an oil locking function according to claim 1, wherein the air guiding tube is inserted into the inner hole of the cigarette holder and is in threaded connection with the cigarette holder.

3. An atomizer with an oil locking function according to claim 2, wherein an annular gasket is arranged between an end of the air guiding tube and an end surface of the inner hole of the cigarette holder.

4. An electronic cigarette, comprising an atomizer and a battery rod assembly, wherein the atomizer is an atomizer with an oil locking function as claimed in claim 3.

5. An electronic cigarette, comprising an atomizer and a battery rod assembly, wherein the atomizer is an atomizer with an oil locking function as claimed in claim 2.

6. An atomizer with an oil locking function according to claim 1, wherein a silica gel sleeve is provided in an inner hole of the base, a thimble sleeve is inserted into the silica gel sleeve and is in electrical connection to the atomizer thimble.

7. An atomizer with an oil locking function according to claim 6, wherein an oil leakage preventing steel ball is embedded in an inner hole of the thimble sleeve, a gas cap is inserted into an inner hole of the thimble sleeve, wherein the oil leakage preventing steel ball is embedded in a chamber that is pressing-formed by the inner hole of the thimble sleeve and the air cap.

8. An electronic cigarette, comprising an atomizer and a battery rod assembly, wherein the atomizer is an atomizer with an oil locking function as claimed in claim 7.

9. An electronic cigarette, comprising an atomizer and a battery rod assembly, wherein the atomizer is an atomizer with an oil locking function as claimed in claim 6.

10. An electronic cigarette, comprising an atomizer and a battery rod assembly, wherein the atomizer is an atomizer with an oil locking function as claimed in claim 1.

* * * * *